US012630736B2

(12) United States Patent
Nielsen et al.

(10) Patent No.: US 12,630,736 B2
(45) Date of Patent: May 19, 2026

(54) NANOEMULSIONS, METHODS OF THEIR PRODUCTION AND RELATED USES AND PRODUCTS

(71) Applicant: PALSGAARD A/S, Juelsminde (DK)

(72) Inventors: Katrine Marie Ellemann Nielsen, Horsens (DK); Jens Viggo Frambøl, Skanderborg (DK)

(73) Assignee: Perstorp AB (SE)

( * ) Notice: Subject to any disclaimer, the term of this patent is extended or adjusted under 35 U.S.C. 154(b) by 1089 days.

(21) Appl. No.: 17/601,541

(22) PCT Filed: Apr. 7, 2020

(86) PCT No.: PCT/EP2020/059890
§ 371 (c)(1),
(2) Date: Oct. 5, 2021

(87) PCT Pub. No.: WO2020/208015
PCT Pub. Date: Oct. 15, 2020

(65) Prior Publication Data
US 2022/0177724 A1 Jun. 9, 2022

(30) Foreign Application Priority Data

Apr. 8, 2019 (EP) .................................... 19167929

(51) Int. Cl.
| | |
|---|---|
| *C09D 167/08* | (2006.01) |
| *C08G 63/60* | (2006.01) |
| *C08G 63/81* | (2006.01) |
| *C08J 3/05* | (2006.01) |
| *C08K 5/09* | (2006.01) |
| *C08L 67/08* | (2006.01) |
| *C09D 5/02* | (2006.01) |
| *C09D 7/43* | (2018.01) |
| *C09D 7/45* | (2018.01) |
| *C09D 7/46* | (2018.01) |

(52) U.S. Cl.
CPC ........... *C09D 167/08* (2013.01); *C08G 63/60* (2013.01); *C08G 63/81* (2013.01); *C08J 3/05* (2013.01); *C08K 5/09* (2013.01); *C08L 67/08* (2013.01); *C09D 5/022* (2013.01); *C09D 7/43* (2018.01); *C09D 7/45* (2018.01); *C09D 7/46* (2018.01)

(58) Field of Classification Search
CPC . C08K 5/09; C08L 67/08; C08G 63/60; C08J 3/05
See application file for complete search history.

(56) References Cited

U.S. PATENT DOCUMENTS

| | | | | |
|---|---|---|---|---|
| 3,979,346 A | * | 9/1976 | Zuckert | C08J 3/05 106/252 |
| 4,419,139 A | * | 12/1983 | Gooch | C09D 167/08 524/904 |
| 10,442,955 B2 | * | 10/2019 | Hendriks | C09D 167/08 |

FOREIGN PATENT DOCUMENTS

| | | | | |
|---|---|---|---|---|
| EP | 2694606 A1 | 2/2014 | | |
| WO | 2014146049 A2 | 9/2014 | | |
| WO | 2015097241 A1 | 7/2015 | | |
| WO | 2017082848 A1 | 5/2017 | | |
| WO | 2018092158 A1 | 5/2018 | | |
| WO | WO-2020187701 A1 | * | 9/2020 | ........... C09D 167/08 |

* cited by examiner

*Primary Examiner* — Vickey Nerangis
(74) *Attorney, Agent, or Firm* — Elmore Patent Law Group, P.C.; Joseph C. Zucchero; Carolyn S. Elmore, Esq.

(57) ABSTRACT

The present invention pertains to nanoemulsions of alkyd in aqueous liquids and e.g. nanoemulsions prepared by emulsifying an alkyd mixture in an aqueous liquid, said alkyd mixture comprising an alkyd and an unsaturated hydroxy fatty acid. The invention furthermore pertains to methods of producing the nanoemulsion, and to uses of the nanoemulsion and/or the alkyd nano droplets contained therein.

16 Claims, 4 Drawing Sheets

Figure 3

Droplet size distribution

NANOEMULSIONS, METHODS OF THEIR PRODUCTION AND RELATED USES AND PRODUCTS

FIELD OF THE INVENTION

The present invention pertains to nanoemulsions of alkyd in aqueous liquids and e.g. nanoemulsions prepared by emulsifying an alkyd mixture in an aqueous liquid, said alkyd mixture comprising an alkyd and an unsaturated hydroxy fatty acid. The invention furthermore pertains to methods of producing the nanoemulsion, and to uses of the nanoemulsion and/or the alkyd nano droplets contained therein.

BACKGROUND

Emulsions of alkyd are frequently used as a coating base in the coating industry and benefit from the ability of alkyd droplets to stay in dispersed, uncured state when dispersed in an aqueous liquid and to form a curing film when applied to a surface and water is allowed to evaporate.

Alkyd emulsion may e.g. be prepared by mechanical shearing of alkyd in water or alternatively by phase inversion of an emulsion of water in alkyd. Under some conditions phase inversion may result in formation of nanoemulsions of alkyd which are particularly interesting and offer an improved stability of coating products during storage.

SUMMARY OF THE INVENTION

The present inventors have discovered that the emulsifiers that conventionally are used for emulsification of alkyd can be replaced by a new class of renewable and environmentally friendly emulsifiers that have not previously been believed to be useful for alkyd emulsification. This new class encompasses:

i) free, unsaturated hydroxy fatty acid (fuhfa), ii) oligoesters of such unsaturated hydroxy fatty acid (ouhfa), and iii) esters of small hydroxy carboxylic acids and i) or ii) (hcuhfa).

The inventors have found these compounds to be particularly advantageous as they are easily derivable from renewable, biosustainable material such as vegetable oil, either by purification of fatty acids from e.g. castor oil which contains a high content of the fatty acid ricinoleic acid, or by simple modification of polyunsaturated fatty acids, which are found in many vegetable oils.

The present invention therefore makes it possible to prepare coating products having an improved biosustainability.

An aspect of the invention pertains to a method of producing a nanoemulsion comprising nano droplets comprising alkyd, said nano droplets are dispersed in an aqueous liquid, the method comprising the step of:

a) providing an alkyd mixture comprising an alkyd and a source of unsaturated hydroxy fatty acid (suhfa), said source comprises:

i) a free, unsaturated hydroxy fatty acid, ii) an oligoester of unsaturated hydroxy fatty acid, and/or iii) a hydroxy carboxylic acid ester of i) or ii) wherein the hydroxy carboxylic acid has a molecular weight of at most 250 g/mol, b) optionally, adding an alkalizing agent to deprotonate at least some of carboxylic acids of the alkyd mixture, c) forming a nanoemulsion of the alkyd mixture in an aqueous liquid.

Another aspect of the invention pertains to an alkyd mixture comprising alkyd and a source of unsaturated hydroxy fatty acid, said source comprises:

i) a free, unsaturated hydroxy fatty acid, ii) an oligoester of unsaturated hydroxy fatty acid, and/or iii) a hydroxy carboxylic acid ester of i) or ii) wherein the hydroxy carboxylic acid has a molecular weight of at most 250 g/mol.

Yet an aspect of the invention pertains to a nanoemulsion of nano droplets comprising alkyd, the nano droplets furthermore comprising a source of unsaturated hydroxy fatty acid, said source comprises:

i) a free, unsaturated hydroxy fatty acid, ii) an oligoester of unsaturated hydroxy fatty acid, and/or iii) a hydroxy carboxylic acid ester of i) or ii) wherein the hydroxy carboxylic acid has a molecular weight of at most 250 g/mol.

A further aspect of the invention pertains to a method of producing a coating product comprising nano droplets comprising alkyd dispersed in an aqueous solvent, the method comprising the steps of:

1) providing a nanoemulsion as defined herein or nano droplets comprising alkyd as defined herein, 2) contacting the nanoemulsion or the nano droplets with one or more additional ingredient(s), e.g. water, a pigment, a thickener, an antifoaming agent, a drying agent, a dispersant, a silicone, a thixotropic agent, an anti-settling agent, a bactericide, a fungicide, an algaecide, and any combination thereof, to obtain a coating mixture, 3) optionally, subjecting the coating mixture to one or more additional processing steps, e.g.

mixing degassing filtration 4) optionally, packaging of the final product in a suitable container.

Another aspect of the invention pertains to a coating product, e.g. obtainable by the above method, comprising nano droplets as defined herein and a drying agent.

Another aspect of the invention pertains to an emulsifier composition comprising:

a) one or more of:

i) a free, unsaturated hydroxy fatty acid, ii) an oligoester of unsaturated hydroxy fatty acid, and/or iii) a hydroxy carboxylic acid ester of i) or ii) wherein the hydroxy carboxylic acid has a molecular weight of at most 250 g/mol, and b) alkalizing agent containing a basic nitrogen atom.

Yet an aspect of the invention pertains to a method of producing the emulsifier composition, the method comprising the steps of:

combining:

a) one or more of:

i) a free, unsaturated hydroxy fatty acid, ii) an oligoester of unsaturated hydroxy fatty acid, and/or iii) a hydroxy carboxylic acid ester of i) or ii) wherein the hydroxy carboxylic acid has a molecular weight of at most 250 g/mol, b) alkalizing agent containing a basic nitrogen atom, and c) optionally, one or more additional ingredients, such as e.g. an additional emulsifier, combining a), b) and optionally c) in sufficient amounts to obtain the emulsifier composition, and optionally, packaging the emulsifier composition.

Further other aspects of the invention pertain to uses of the products defined herein.

BRIEF DESCRIPTION OF THE FIGURES

FIG. 3 shows the droplet size distribution of nanoemulsions according to the invention (C-E and H-K) compared to reference emulsions (A, B, F and G).

DETAILED DESCRIPTION

Figure 1:
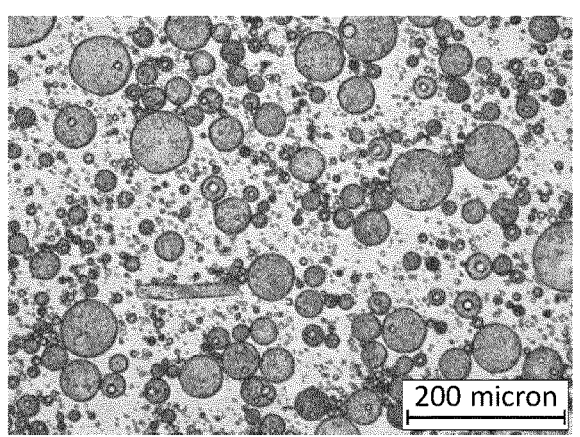
FIG. 1 shows a microscopy photo of two reference emulsions
Figure 1:
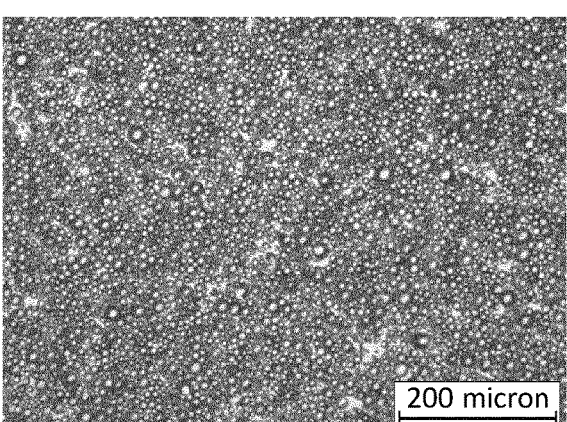

An aspect of the invention pertains to method of producing a nanoemulsion comprising nano droplets comprising alkyd, said nano droplets are dispersed in an aqueous liquid, the method comprising the step of:

a) providing an alkyd mixture comprising an alkyd and a source of unsaturated hydroxy fatty acid, said source comprises:

i) a free, unsaturated hydroxy fatty acid, ii) an oligoester of unsaturated hydroxy fatty acid, and/or iii) a hydroxy carboxylic acid ester of i) or ii) wherein the hydroxy carboxylic acid has a molecular weight of at most 250 g/mol, b) optionally, adding an alkalizing agent to deprotonate at least some of carboxylic acids of the alkyd mixture, c) forming a nanoemulsion of the alkyd mixture in an aqueous liquid.

In the context of the present invention the term "alkyd" pertains to a polyester of polyol(s) and a di- or tri-carboxylic acid(s), which polyester is modified by the addition of fatty acids and other components. The polyester of the alkyds are typically produced by reacting polyol(s) with a di- or tri-carboxylic acid or a carboxylic acid anhydride. The fatty acids are esterified onto the polyester backbone of the alkyd and confer a tendency to form flexible coating. Alkyds are therefore often used in coatings and in moulds for casting. They are the dominant resin or "binder" in most commercial "oil-based" coatings. The terms "alkyd" and "alkyd resin" are used interchangeably herein.

In the context of the present invention the term "alkyd mixture" pertains to a mixture comprising an alkyd, a suhfa and optionally also additional emulsifiers. However, in some preferred embodiments of the invention the suhfa is predominant and e.g. the only emulsifier present in the alkyd mixture.

In the context of the present invention the term "unsaturated hydroxy fatty acid", abbreviated uhfa, pertains to fatty acids with contain one or more double bonds and which furthermore contain one or more hydroxy group. An example of an unsaturated hydroxy fatty acid is ricinoleic acid. As used herein the term uhfa denotes both free and bound uhfa and encompasses both uhfa in protonated and deprotonated form.

In the context of the present invention the term "source of unsaturated hydroxy fatty acid", abbreviated "suhfa", pertains to the source or combination of sources which provide the following components to the alkyd mixture:

i) a free, unsaturated hydroxy fatty acid, ii) an oligoester of unsaturated hydroxy fatty acid, and/or iii) a hydroxy carboxylic acid ester of i) or ii) wherein the hydroxy carboxylic acid has a molecular weight of at most 250 g/mol.

In the context of the present invention the term "free, unsaturated hydroxy fatty acid" abbreviated "fuhfa" pertains to an unsaturated hydroxy fatty acid in protonated or deprotonated form which has not formed a covalent bond to any other molecule. The term fuhfa therefore covers both the free acid form of the fuhfa as well as the neutralized form, e.g. in the form of one or more salts.

In the context of the present invention the term "oligoester of unsaturated hydroxy fatty acid" abbreviated "ouhfa" pertains to free esters of 2-6 uhfa, and preferably uhfa of the same type. Examples are di-ricinoleic acid, tri-ricinoleic acid, tetra-ricinoleic acid, penta-ricinoleic acid, and hexa-ricinoleic acid. The term ouhfa covers both the free acid form of the ouhfa as well as salts thereof.

In the context of the present invention the term "hydroxy carboxylic acid ester of a fuhfa or an ouhfa" abbreviated "hcuhfa" pertains to free esters of a fuhfa or an ouhfa and a hydroxy carboxylic acid which has a molecular weight of at most 250 g/mol. An example of an hcuhfa is an ester of lactic acid and ricinoleic acid. The term hcuhfa covers both the free acid form of the hcuhfa as well as salts thereof.

Step a) requires the provision of an alkyd mixture comprising an alkyd and a source of unsaturated hydroxy fatty acid, said suhfa comprises:

i) a free, unsaturated hydroxy fatty acid, ii) an oligoester of unsaturated hydroxy fatty acid, and/or iii) a hydroxy carboxylic acid ester of i) or ii) wherein the hydroxy carboxylic acid has a molecular weight of at most 250 g/mol.

In some preferred embodiments of the invention the alkyd mixture comprises an alkyd and a suhfa, which comprises or even essentially consists of fuhfa.

In other preferred embodiments of the invention the alkyd mixture comprises an alkyd and a suhfa, which comprises or even essentially consists of ouhfa.

In further preferred embodiments of the invention the alkyd mixture comprises an alkyd and a suhfa, which comprises or even essentially consists of hcuhfa.

In some preferred embodiments of the invention the alkyd comprises, or even consists of:

long oil alkyd, medium oil alkyd, and/or short oil alkyd.

Long oil alkyd resin contains more than 60% fatty acids by weight, medium oil alkyd resin contains 40% to 60% fatty acids by weight, and short oil alkyd resin contains less than 40% fatty acids by weight.

In some preferred embodiments of the invention the alkyd is a long oil alkyd. In other preferred embodiments of the invention the alkyd is a short oil alkyd. In particularly preferred embodiments of the invention the alkyd is a medium oil alkyd.

In some preferred embodiments of the invention the alkyd has an acid value of at most 20 mg KOH/g, preferably at most 15 mg KOH/g and even more preferably at most 10 mg KOH/g.

The alkyd typically has an acid value in the range of 1-20 mg KOH/g, preferably 2-16 mg KOH/g, more preferably 4-14 mg KOH/g, and most preferably 5-10 mg KOH/g.

A low acid value of the alkyd provides a high degree of hydrophobicity whereas a higher acid value provides an increasing hydrophilicity and an increasing water-permeability of dried coatings based on the alkyd.

The term "acid value" is well-known to the skilled person and denotes the amount of KOH in mg that is required to neutralise 1 g of material. The acid value is determined according to Example 1.4.

In some preferred embodiments of the invention the alkyd has a water content of at most 5% w/w, preferably at most 2% w/w, more preferably at most 1% w/w, even more preferably at most 0.5% w/w, and most preferably at most 0.1% w/w.

The water content of an alkyd is measured according to Example 1.5.

In some preferred embodiments of the invention the alkyd has a content of volatile organic compounds (VOC) of at most 50 g/L, preferably at most 20 g/L, more preferably at most 5 g/L, even more preferably at most 1 g/L, and most preferably at most 0.1 g/L.

In some preferred embodiments of the invention the alkyd has a content of fuhfa of at most 4% w/w, preferably at most 2% w/w, more preferably at most 1% w/w, even more preferably at most 0.5% w/w, and most preferably at most 0.1% w/w.

In some preferred embodiments of the invention the suhfa comprises one or more of the following i) at least 10% w/w of free unsaturated hydroxy fatty acid, ii) at least 1% w/w of di(unsaturated hydroxy fatty acid) (duhfa), and iii) at least 1% w/w of tri(unsaturated hydroxy fatty acid) (tuhfa).

In other preferred embodiments of the invention the suhfa contains i) 10-99% w/w of free unsaturated hydroxy fatty acid, ii) 1-50% w/w of di(unsaturated hydroxy fatty acid), and iii) 0-30% w/w of tri(unsaturated hydroxy fatty acid).

More preferably, the suhfa contains i) 60-95% w/w of free unsaturated hydroxy fatty acid, ii) 5-40% w/w of di(unsaturated hydroxy fatty acid), and iii) 0-30% w/w of tri(unsaturated hydroxy fatty acid).

In further preferred embodiments of the invention the suhfa contains i) 1-50% w/w of free unsaturated hydroxy fatty acid, ii) 10-98% w/w of di(unsaturated hydroxy fatty acid), and iii) 1-30% w/w of tri(unsaturated hydroxy fatty acid).

In other preferred embodiments of the invention the suhfa contains i) 0-30% w/w of free unsaturated hydroxy fatty acid, ii) 1-40% w/w of di(unsaturated hydroxy fatty acid)a, and iii) 10-98% w/w of tri(unsaturated hydroxy fatty acid).

In some preferred embodiments of the invention the suhfa comprises at least 50% w/w of fuhfa, preferably at least 60% w/w of fuhfa, more preferred at least 80% w/w of fuhfa, even more preferred at least 90% w/w of fuhfa, and most preferred at least 95% w/w of fuhfa. It is particularly preferred that the suhfa contains approx. 100% w/w of fuhfa.

In other preferred embodiments of the invention the sum of fuhfa, duhfa and tuhfa contributes to at least 10% w/w of the total weight of the suhfa, preferably at least 20% w/w more preferably at least 50% w/w, even more preferably at least 70% w/w, and most preferably at least 90% w/w.

In some preferred embodiments of the invention the suhfa has a water content of at most 5% w/w, preferably at most 2% w/w, more preferably at most 1% w/w, even more preferably at most 0.5% w/w, and most preferably at most 0.1% w/w.

The present inventors have found that a suhfa having a low water content can be mixed more efficiently into the alkyd than suhfas having a higher water content.

The present inventors have observed that efficient mixing of suhfa and alkyd may be achieved if the fuhfa, ouhfa and/or hcuhfa is/are in its protonated form when mixed with alkyd. The degree of protonation can be measured by the acid value.

Thus, in some preferred embodiments of the invention the suhfa has an acid value of at least 140 mg KOH/g sample, preferably at least 150 mg KOH/g sample, and even more preferably at least 160 mg KOH/g sample. These acid values are particularly preferred in relation of suhfas having a high content of fuhfa, such as e.g. suhfa comprising fuhfa in an amount of at least 60% w/w. The suhfa may e.g. have an acid value in the range of 140-250 mg KOH/g sample, preferably in the range of 150-220 mg KOH/g sample, and even more preferably in the range of 160-200 mg KOH/g sample.

In other preferred embodiments of the invention the suhfa has an acid value of at least 130 mg KOH/g sample, and more preferably at least 135 mg KOH/g sample. The suhfa may e.g. have an acid value in the range of 130-250 mg KOH/g sample, and more preferably in the range of 135-220 mg KOH/g sample.

The inventors have furthermore seen indications that efficient mixing of suhfa and alkyd also may be achieved if the fuhfa, ouhfa and/or hcuhfa of the suhfa is/are in its deprotonated form. This mixing is particularly efficient if the fuhfa, ouhfa and/or hcuhfa is present in a form that is sufficiently soft to be mixed into the alkyd. It is particularly preferred to use the fuhfa, ouhfa and/or hcuhfa in combination with an alkalizing agent containing a basic nitrogen atom. The alkalizing agent containing a basic nitrogen atom is preferably used to deprotonate the fuhfa, ouhfa and/or hcuhfa. The alkalizing agent containing a basic nitrogen atom can be added to suhfa prior to addition to the alkyd or may be added to the alkyd prior to, during and/or after the addition of the suhfa.

The inventors have found that it is advantageous to combine the suhfa with an alkalizing agent containing a basic nitrogen atom before it to the alkyd mixture. Preferably the suhfa and the alkalizing agent containing a basic nitrogen atom is in the form of an emulsifier composition as defined herein when added to the alkyd.

In the context of the present invention the term "alkalizing agent containing a basic nitrogen atom" pertains to an amine compound, ammonia or a combination thereof. The amine compound may e.g. contain a primary amine, a secondary amine, a tertiary amine or a combination thereof. The alkalizing agent containing a basic nitrogen atom preferably has a molecular weight of at most 300 g/mol, and more preferred at most 150 g/mol.

In some preferred embodiments of the present invention the alkalizing agent containing a basic nitrogen atom has a molecular weight of at most 300 g/mol.

It even more preferred embodiments of the present invention the alkalizing agent containing a basic nitrogen atom has a molecular weight of at most 150 g/mol.

In some preferred embodiments of the present invention the alkalizing agent containing a basic nitrogen atom contains one or two hydroxy groups.

In other preferred embodiments of the present invention the alkalizing agent containing a basic nitrogen atom comprises or even consists of one or more amino alcohols, and more preferably one or more alkanolamines.

The present inventors have found amino alcohols advantageous relative to e.g. hydroxy-free amines as the latter tend to release an unpleasant fishy smell whereas amino alcohols are more sensory neutral.

In some preferred embodiments of the present invention the alkalizing agent containing a basic nitrogen atom comprises or even consists of one or more of 1-amino-2-propanol, 1-amino-3-propanol, and/or ethanolamine.

A presently preferred alkalizing agent containing a basic nitrogen atom is 1-amino-2-propanol.

The suhfa, the alkyd mixture, the nanoemulsion, the nanodroplets of alkyd, and/or the coating product preferably contains a molar ratio between the alkalizing agent containing a basic nitrogen atom and the sum of fuhfa and ouhfa in the range of 1:3 to 5:1; more preferably in the range of 1:2 to 4:1, and even more preferably 1:1 to 3:1.

When mixed with the suhfa or the alkyd mixture at least some of the alkalizing agent containing a basic nitrogen atom will become protonated when neutralizing carboxylic acids.

It is particularly preferred that:

the alkalizing agent containing a basic nitrogen atom has a molecular weight of at most 150 g/mol and that said alkalizing agent containing a basic nitrogen atom furthermore contains one or two hydroxy groups, and the suhfa, the alkyd mixture, the nanoemulsion, and/or the nanodroplets of alkyd contain a molar ratio between the alkalizing agent containing a basic nitrogen atom and the sum of fuhfa and ouhfa in the range of 1:3 to 5:1; more preferably in the range of 1:2 to 4:1, and even more preferably 1:1 to 3:1

In some preferred embodiments of the invention the suhfa has a hydroxyl value of at least 140 mg KOH/g sample, preferably at least 145 mg KOH/g, more preferably at least 150 mg KOH/g, and even more preferably at least 155 mg KOH/g. The suhfa may e.g. have a hydroxyl value in the range of 140-250 mg KOH/g sample, preferably in the range of 145-220 mg KOH/g, more preferably in the range of 150-220 mg KOH/g, and even more preferably in the range of 155-200 mg KOH/g.

In other preferred embodiments of the invention the suhfa has a hydroxyl value in the range of 140-500 mg KOH/g sample, more preferably in the range of 145-400 mg KOH/g, even more preferably in the range of 150-350 mg KOH/g, and most preferably in the range of 155-300 mg KOH/g.

The hydroxyl value of a composition is measured according to Example 1.3.

In some preferred embodiments of the invention the suhfa has an iodine value of at least 60 g $I_2$/100 g, preferably at least 70 g $I_2$/100 g, more preferably at least 80 g $I_2$/100 g, and most preferably at least 85 g $I_2$/100 g. The suhfa may e.g. have an iodine value in the range of 60-200 g $I_2$/100 g, preferably in the range of 65-150 g $I_2$/100 g, more preferably in the range of 70-100 g $I_2$/100 g, and most preferably at least 75-95 g $I_2$/100 g.

In other preferred embodiments of the invention the suhfa has an iodine value in the range of 60-100 g $I_2$/100 g, preferably in the range of 62-90 g $I_2$/100 g, more preferably in the range of 64-80 g $I_2$/100 g, and most preferably at least 65-75 g $I_2$/100 g.

The iodine value of a composition is measured according to Example 1.2.

The uhfa is preferably a C14-24 fatty acid, more preferably a C16-C20 fatty acid, and most preferably a C18 fatty acid.

In some preferred embodiments of the invention the uhfa comprises or even consists of omega-9 fatty acid.

Useful examples of uhfa are ricinoleic acid, lesquerolic acid, densipolic acid, and auricolic acid.

In some particularly preferred embodiments of the invention the uhfa comprises, or even consists of, ricinoleic acid. Thus, a particularly preferred example of an uhfa is ricinoleic acid.

The suhfa may be derived from natural sources or prepared synthetically. In some preferred embodiments of the invention the suhfa is the fatty acids fraction prepared by hydrolysis of castor oil and removal of non-fatty acid components. Such a suhfa has a very high content of ricinoleic acid.

Alternatively but also preferred, the suhfa may be prepared by partial addition of water to double bonds of polyunsaturated fatty acids. The addition is partial in the sense that only some double bonds should be added water to avoid that the fatty acids becomes too saturated.

The alkyd mixture typically contains a total amount of alkyd of at least 60% w/w, preferably at least 70% w/w, more preferably at least 80% w/w, and even more preferably at least 90% w/w.

In some preferred embodiments of the invention the alkyd mixture contains a total amount of alkyd in the range of 60-97% w/w, preferably in the range of 70-96% w/w, more preferably in the range of 80-95% w/w, and even more preferably in the range of 85-94% w/w.

In some preferred embodiments of the invention the weight ratio between the total amount of suhfa and the total amount of alkyd of the alkyd mixture of step a) is 0.01-0.30, preferably 0.02-0.25, more preferably 0.03-0.20, even more preferably 0.05-0.18, and most preferably 0.06-0.12.

In the context of the present invention a "weight ratio between component A and component B" is calculated as $weight_{component\ A}/weight_{component\ B}$ wherein the two weights are presented in the same weight unit. For example, the weight ratio between the total amount of suhfa and the total amount of alkyd should be calculated as $weight_{total\ amount\ of\ suhfa}/weight_{total\ amount\ of\ alkyd}$.

In some preferred embodiments of the invention the weight ratio between the total amount of fuhfa+duhfa+tuhfa and the total amount of alkyd of the alkyd mixture of step a) is 0.01-0.30, preferably 0.02-0.25, more preferably 0.03-0.20, even more preferably 0.05-0.18, and most preferably 0.06-0.12.

In some particularly preferred embodiments of the invention the weight ratio between the total amount of fuhfa+duhfa and the total amount of alkyd of the alkyd mixture of step a) is 0.01-0.30, preferably 0.02-0.25, more preferably 0.03-0.20, even more preferably 0.05-0.18, and most preferably 0.06-0.12.

In other particularly preferred embodiments of the invention the weight ratio between the total amount of fuhfa and the total amount of alkyd of the alkyd mixture of step a) is 0.01-0.30, preferably 0.02-0.25, more preferably 0.03-0.20, even more preferably 0.05-0.18, and most preferably 0.06-0.12.

In the context of the invention the term "the total amount of fuhfa+duhfa+tuhfa" means the sum of the total amount of fuhfa, the total amount of duhfa, and the total amount of tuhfa.

In the context of the invention the term "the total amount of fuhfa+duhfa" means the sum of the total amount of fuhfa and the total amount of duhfa.

While it is envisioned that the alkyd mixture will be commercially available in the future, it is preferably prepared by mixing an alkyd with a suhfa, preferably in the weight ratios described herein or in amounts sufficient to provide the amounts of fuhha, ouhfa and/or hcuhfa described herein. The mixing may e.g. be performed by combining the alkyd with the suhfa and optionally other ingredients and stirring the combination thoroughly to obtain the alkyd mixture.

The temperature during such mixing is typically in the range of 0-200 degrees C., preferably in the range 10-150 degrees C., more preferably 20-100 degrees C.

The alkyd mixture may furthermore comprise other ingredients. The alkyd mixture may e.g. comprise one or more co-surfactant(s) and/or one or more additional emulsifier(s).

In some preferred embodiments of the invention the alkyd mixture contains one or more additional emulsifier(s), e.g. emulsifiers that traditionally have been used for emulsifying alkyd for production of alkyd dispersions. Other examples could include non-ionic ethylene oxide propylene oxide block copolymer types of emulsifiers, alkylbenzene sulphonates, fatty alcohol ethoxylates, fatty alcohol ether sulphates, polyglycerol esters of fatty acids, polyglycerol polyricinoleate, and styrenated phenol-based surfactants. Further examples include poly propylene glycol esters of fatty acids, poly-(1,3-propandiol) esters of fatty acids, co-polymers of any of the monomers chosen among glycerol, propylene glycol, 1,3-propandiol esterified with fatty acids.

In some preferred embodiments of the invention the alkyd mixture contains one or more co-surfactant(s). Such a co-surfactant interacts with the uhfa and preferably improves its functionality but need not be a surfactant itself. Preferred co-surfactants can e.g. be found amongst amine compounds, amino alcohols, ammonia, n-alcohols, glycol ethers, polyethylene glycols, and alkyl carboxylic acids and carboxylates.

The co-surfactant is preferably present in the suhfa, the alkyd mixture, the nanoemulsion, and/or the nanodroplets of alkyd in an amount sufficient to bind to the majority of the carboxylic acid groups of the fuhfa or ouhfa. The suhfa, the alkyd mixture, the nanoemulsion, the nanodroplets of alkyd, and/or the coating product preferably contains a molar ratio between the co-surfactant and the sum of fuhfa and ouhfa in the range of 1:10 to 10:1; more preferably in the range of 1:5 to 5:1, and even more preferably 1:1 to 3:1.

In some preferred embodiments of the invention, the method does not comprise step b) and hence contain step a) directly following by step c). For example, step b) is not required if the fuhfa, ouhfa, and/or hcuhfa are already present in deprotonated form in the alkyd mixture, e.g. in combination with an alkalizing agent containing a basic nitrogen atom as described above.

However, in other preferred embodiments the method of the invention contains a step b) of adding an alkalizing agent to deprotonate at least some of carboxylic acids of the alkyd mixture. The alkalizing agent is preferably mixed into the alkyd mixture. In some preferred embodiments of the invention the amount of added alkalizing agent is sufficient to deprotonate at least 75% of the fuhfa, ouhfa and/or hcuhfa of the alkyd mixture, preferably at least 90%, and even more preferably at least 100% of the fuhfa, ouhfa and/or hcuhfa.

In some preferred embodiments of the invention the amount of added alkalizing agent is sufficient to deprotonate at least 10% of the acid of the alkyd, more preferably at least 20% of the acid of the alkyd, even more preferably at least 30% of the acid of the alkyd, and most preferred at least 40% of the acid of the alkyd.

In some preferred embodiments of the invention the alkalizing agent is added in solid, liquid or dissolved form. If the alkalizing agent is added in dissolved form it is preferably added in the form of an aqueous solution.

In some preferred embodiments of the invention the alkalizing agent comprises a hydroxide salt and/or an alkalizing agent containing a basic nitrogen atom as defined herein.

Step c) involves forming a nanoemulsion of the alkyd mixture in an aqueous liquid. The formation of the nanoemulsion may e.g. involve mechanical shearing and/or phase inversion. The emulsification, e.g. by mechanical shearing and/or phase inversion, preferably provides a nanoemulsion containing nano droplets of the alkyd mixture dispersed in the aqueous liquid.

In the context of the present invention the term "aqueous liquid" pertains to the liquid that is used to emulsify the alkyd mixture. The aqueous liquid may contain dispersed and/or dissolved matter in addition to water. The aqueous liquid preferably contains water in an amount of at least 50% w/w, more preferably at least 70% w/w, even more preferably at least 90% w/w, and most preferably at least 95% w/w.

In some preferred embodiments of the invention the aqueous liquid is water, such as e.g. demineralised water or tap water.

If the alkyd mixture is emulsified by mechanical shearing the alkyd mixture is preferably mixed with the aqueous liquid by high shear mixing. Shear-based systems for emulsifying alkyd mixtures in aqueous liquids are well-known to the skilled person.

It is particularly preferred to form the nanoemulsion by emulsifying the aqueous liquid into the alkyd mixture and cause phase inversion to take place. The phase inversion provides a nanoemulsion containing nano droplets of the alkyd mixture. The nano droplets of the alkyd mixture are dispersed in the aqueous liquid.

The term "nano droplets comprising alkyd" means nano droplets of the alkyd mixture as described herein.

A particularly preferred method for causing the phase inversion to take place is to continue emulsifying the aqueous liquid into the alkyd mixture until phase inversion has occurred and a nanoemulsion containing nano droplets of the alkyd mixture has formed. The emulsification is preferably performed by gradually adding and mixing water into the alkyd mixture. The initial emulsification results in a formation of a water-in-oil emulsion in which the aqueous liquid has been emulsified into the alkyd mixture. However, when sufficient aqueous liquid has been emulsified into the alkyd mixture the water-in-oil emulsion becomes unstable and undergoes phase inversion to an oil-in-water emulsion of alkyd nano droplets dispersed in the aqueous liquid. Without being bound by theory it is believed that the phase inversion is a so-called catastrophic phase inversion.

Alternatively, the phase inversion may be caused in other ways e.g. by changing physical and/or chemical parameters such as e.g. pH, temperature, or pressure or by high shear treatment.

The present inventors have found that contrary to conventional emulsifiers used for preparation of nanoemulsions of alkyd, fuhfa, ouhfa and hcuhfa do not appear to have a specific phase inversion temperature (PIT) at which the emulsification and phase inversion have to take place. This means that the present emulsifiers can be used to prepare nanoemulsions of alkyds over a much broader temperature range and allow for nanoemulsification of alkyds that had no compatible emulsifier previously.

In some preferred embodiments of the invention the aqueous liquid of step c) has a pH in the range of 5-13, preferably 6-9, and more preferably a pH in the range of 7.0-8.5, and most preferably a pH in the range of 7.0-8.0.

If the alkyd mixture comprises an ouhfa and/or a hcuhfa it may be preferred to perform step c) at a pH higher than pH 7.5 and apply moderate heating, e.g. to a temperature in the range of 30-80 degrees C. for a duration sufficient to hydrolyse hcuhfa or ouhfa into fuhfa and optionally also into duhfa. Thus, some preferred embodiments of the invention the aqueous liquid of step c) has a pH in the range of 8.0-13, preferably 8.5-12, and more preferably a pH in the range of 9.0-11.

The temperature during the mixing of step c) is preferably chosen sufficiently high to ensure good mixing conditions between the components in the alkyd mixture and the aqueous liquid during emulsification and at the same time low enough to provide the needed shear for nano emulsification to take place.

The temperature during the mixing of step c) is preferably in the range of 0-200 degrees C., and if possible, preferably in the range of 10-50 degrees C. If a temperature of 90 degrees C. or higher is required, it is preferred that the addition of water and mixing is performed in a closed system under pressure and/or with reflux to avoid uncontrolled evaporation of water during mixing.

The nano droplets comprising alkyd preferably have an average hydrodynamic diameter of at most 350 nm, more preferably at most 300 nm, even more preferably at most 250 nm, and most preferably at most 200 nm.

In some preferred aspects of the invention the nano droplets comprising alkyd have an average hydrodynamic diameter of at most 300 nm, preferably at most 250 nm, more preferably at most 200 nm, and most preferably at most 180 nm.

The average hydrodynamic diameter of a particle population is measured according to Example 1.7.

Yet an aspect of the invention pertains to an alkyd mixture as described herein, comprising a mixture comprising alkyd and a source of unsaturated hydroxy fatty acid, said suhfa comprises:

i) a free, unsaturated hydroxy fatty acid,
ii) an oligoester of unsaturated hydroxy fatty acid, and/or
iii) a hydroxy carboxylic acid ester of i) or ii) wherein the hydroxy carboxylic acid has a molecular weight of at most 250 g/mol.

In some preferred embodiments of the invention the alkyd mixture has a weight ratio between the total amount of fuhfa+duhfa+tuhfa and the total amount of alkyd in the range of 0.01-0.30, preferably 0.02-0.25, more preferably 0.03-0.20, even more preferably 0.05-0.18, and most preferably 0.06-0.12.

In some particularly preferred embodiments of the invention the alkyd mixture has a weight ratio between the total amount of fuhfa+duhfa and the total amount of alkyd in the range of 0.01-0.30, preferably 0.02-0.25, more preferably 0.03-0.20, even more preferably 0.05-0.18, and most preferably 0.06-0.12.

In other particularly preferred embodiments of the invention the alkyd mixture has a weight ratio between the total amount of fuhfa and the total amount of alkyd in the range of 0.01-0.30, preferably 0.02-0.25, more preferably 0.03-0.20, even more preferably 0.05-0.18, and most preferably 0.06-0.12.

The alkyd mixture typically contains a total amount of alkyd of at least 60% w/w, preferably at least 70% w/w, more preferably at least 80% w/w, and even more preferably at least 90% w/w.

In some preferred embodiments of the invention the alkyd mixture contains a total amount of alkyd in the range of 60-97% w/w, preferably in the range of 70-96% w/w, more preferably in the range of 80-95% w/w, and even more preferably in the range of 85-94% w/w.

It is furthermore preferred that the alkyd mixture, the nano-droplets, and/or the coating product of the present invention has a content of VOC of at most 50 g/L, preferably at most 20 g/L, more preferably at most 5 g/L, even more preferably at most 1 g/L, and most preferably at most 0.1 g/L.

A further aspect of the invention pertains to a nanoemulsion of nano droplets comprising alkyd, e.g. obtainable by the method described herein, the nano droplets furthermore comprising a source of unsaturated hydroxy fatty acid, said source comprises:

i) a free, unsaturated hydroxy fatty acid,
ii) an oligoester of unsaturated hydroxy fatty acid, and/or
iii) a hydroxy carboxylic acid ester of i) or ii) wherein the hydroxy carboxylic acid has a molecular weight of at most 250 g/mol.

In some preferred embodiments of the invention the nanoemulsion of nano droplets has a weight ratio between the total amount of fuhfa+duhfa+tuhfa and the total amount of alkyd in the range of 0.01-0.30, preferably 0.02-0.25, more preferably 0.03-0.20, even more preferably 0.05-0.18, and most preferably 0.06-0.12.

In some particularly preferred embodiments of the invention the nanoemulsion of nano droplets has a weight ratio between the total amount of fuhfa+duhfa and the total amount of alkyd in the range of 0.01-0.30, preferably 0.02-0.25, more preferably 0.03-0.20, even more preferably 0.05-0.18, and most preferably 0.06-0.12.

In other particularly preferred embodiments of the invention the nanoemulsion of nano droplets has a weight ratio between the total amount of fuhfa and the total amount of alkyd in the range of 0.01-0.30, preferably 0.02-0.25, more preferably 0.03-0.20, even more preferably 0.05-0.18, and most preferably 0.06-0.12.

The nano droplets of the nanoemulsion typically contain a total amount of alkyd of at least 60% w/w, preferably at least 70% w/w, more preferably at least 80% w/w, and even more preferably at least 90% w/w.

In some preferred embodiments of the invention the nano droplets of the nanoemulsion contain a total amount of alkyd in the range of 60-97% w/w, preferably in the range of 70-96% w/w, more preferably in the range of 80-95% w/w, and even more preferably in the range of 85-94% w/w.

The nanoemulsions of the present invention are preferably emulsions of alkyd-containing matter in an aqueous medium.

In the context of the present invention the term "aqueous medium" pertains to the liquid in which nano droplets comprising alkyd are dispersed. The aqueous medium may contain dispersed and/or dissolved matter in addition to water. The aqueous medium preferably contains water in an amount of at least 50% w/w, more preferably at least 70% w/w, even more preferably at least 90% w/w, and most preferably at least 95% w/w.

In some preferred embodiments of the invention the aqueous medium is water, such as e.g. demineralised water or tap water.

In some preferred embodiments of the invention the nanoemulsions do not contain drying agents. This has the advantage that the nanoemulsions have a reduced sensitivity to oxygen and therefore can be handled in an oxygen-containing atmosphere without initiating polymerisation of the alkyd.

Another aspect of the invention pertains to a population of nano droplets comprising alkyd, e.g. obtainable by the method described herein, the nano droplets furthermore comprise a suhfa, said source comprises:

i) a free, unsaturated hydroxy fatty acid, ii) an oligoester of unsaturated hydroxy fatty acid, and/or iii) a hydroxy carboxylic acid ester of i) or ii) wherein the hydroxy carboxylic acid has a molecular weight of at most 250 g/mol.

In some preferred embodiments of the invention the nano droplets have a weight ratio between the total amount of fuhfa+duhfa+tuhfa and the total amount of alkyd in the range of 0.01-0.30, preferably 0.02-0.25, more preferably 0.03-0.20, even more preferably 0.05-0.18, and most preferably 0.06-0.12.

In some particularly preferred embodiments of the invention the nano droplets have a weight ratio between the total amount of fuhfa+duhfa and the total amount of alkyd in the range of 0.01-0.30, preferably 0.02-0.25, more preferably 0.03-0.20, even more preferably 0.05-0.18, and most preferably 0.06-0.12.

In other preferred embodiments of the invention the nano droplets have a weight ratio between the total amount of fuhfa and the total amount of alkyd in the range of 0.01-0.30, preferably 0.02-0.25, more preferably 0.03-0.20, even more preferably 0.05-0.18, and most preferably 0.06-0.12.

The nano droplets typically contain a total amount of alkyd of at least 60% w/w, preferably at least 70% w/w, more preferably at least 80% w/w, and even more preferably at least 90% w/w.

In some preferred embodiments of the invention the nano droplets contain a total amount of alkyd in the range of 60-97% w/w, preferably in the range of 70-96% w/w, more preferably in the range of 80-95% w/w, and even more preferably in the range of 85-94% w/w.

A further aspect of the invention pertains to a method of producing a coating product comprising nano droplets comprising alkyd dispersed in an aqueous solvent, the method comprising the step of:

1) providing a nanoemulsion as described herein or nano droplets comprising alkyd as described herein, 2) contacting, and preferably mixing, the nanoemulsion or nano droplets with one or more additional ingredient(s), e.g. water, a pigment, a thickener, a preservative, drying agents, to obtain a coating mixture, 3) optionally, subjecting the coating mixture to one or more additional processing steps, e.g. hydration, additional mixing, and/or degassing, 4) optionally, packaging of the final product in a suitable container.

In the context of the present invention the term "aqueous solvent" pertains to the liquid solution in which the nano droplets comprising alkyd are dispersed. The aqueous solvent may contain dispersed and/or dissolved matter in addition to water. The aqueous solvent preferably contains water in an amount of at least 50% w/w, more preferably at least 70% w/w, even more preferably at least 90% w/w, and most preferably at least 95% w/w.

In some preferred embodiments of the invention the aqueous solvent is water, such as e.g. demineralised water or tap water.

The coating product is preferably an emulsion-type coating product having an aqueous continuous phase.

Yet another aspect of the invention pertains to a coating product, e.g. obtainable by the method described herein, comprising i) nano droplets as described herein or ii) a nanoemulsion as described herein, and additionally comprising a drying agent and/or a pigment.

The coating product of the present invention is preferably a water-based coating product meaning that it contains e.g. nano droplets comprising alkyd suspended in an aqueous continuous phase.

In some preferred embodiments of the invention the coating product comprises: a total amount of nano droplets as described herein in the range of 10-50% w/w, preferably in the range of 15-45% w/w, more preferably in the range of 20-40% w/w, a total amount of water in the range of a total amount of water in the range of 10-80% w/w, preferably in the range of 30-75% w/w, more preferably in the range of 45-70% w/w, a total amount of drying agent of at least 0.05% w/w, preferably in the range of 0.1-4% w/w, more preferably in the range of 0.2-2% w/w, a total amount of pigment of 0-40% w/w, preferably in the range of 1-40% w/w, more preferably in the range of 5-30% w/w, a total amount of antifoaming agent in the range of 0-2%, preferably in the range of 0.01-1.5% w/w, more preferably in the range of 0.05-0.3% w/w, a total amount of thickening agent in the range of 0-4%, preferably in the range of 0.1-3% w/w, more preferably in the range of 0.3-1% w/w, a total amount of preservative in the range of 0-4%, preferably in the range of 0.1-3% w/w, more preferably in the range of 0.3-1% w/w.

The pH of the coating product is preferably in the range of 6-10, and more preferably in the range of 7-9.

The present inventors have found that dried films of the coating products according to the present invention display high gloss and are very stable under all studied conditions. Some indications point to a stabilizing effect under UV light. This is most likely due to the ability of suhfa to take part in the autoxidative process during coat formation. The high gloss of the films supports the notion that the emulsifier becomes cross-linked within the coating, which is highly desirable in order to avoid migration to the surface of the surfactant, leading to lower quality paints due to build-up of hydrophilic components on the surface and the possibility of colour degradation if pigments are used in the coating formulation.

In some preferred embodiments of the invention the coating product, e.g. a clear coat paint formulation based on alkyd emulsions, comprises:

| | |
|---|---|
| Water | 25-35% |
| Thickener | 0-3% |
| Preservative | 0-1% |
| Drying agent | 0-1% |
| Defoamer | 0.1% |
| Alkyd emulsion | 55-75% |

In other preferred embodiments of the invention the coating product, e.g. a matt paint formulation, comprises:

| Water | 10-15% |
| Pigment, e.g. TiO$_2$ | 10-15% |
| Filler, e.g. fine CaCO$_3$ | 25-30% |
| Filler, e.g. medium CaCO$_3$ | 25-30% |
| Dispersing agent | 0-2% |
| Thickener | 0-3% |
| Preservative | 0-1% |
| Defoamer | 0.1% |
| Drying agent | 0-1% |
| Alkyd emulsion | 10-15% |

In additional preferred embodiments of the invention the coating product, e.g. a waterborne trim/house paint, comprises

| Water | 0-2% |
| Pigment paste | 30-40% |
| Drying agent | 0.5% |
| Defoamer | 0.3% |
| Alkyd emulsion | 60-70% |

Yet an aspect of the invention pertains to a dried film of the coating product.

Another aspect of the invention pertains to the use of a suhfa or an emulsifier composition as defined herein as emulsifier, e.g. the only emulsifier or in combination with one or more other emulsifier(s) and/or co-surfactant(s), for forming a nanoemulsion of alkyd in an aqueous liquid.

A further aspect of the invention pertains to the use of an alkyd mixture as defined herein for production of a nanoemulsion.

Yet a further aspect of the invention pertains to the use of i) the nano droplet described herein or ii) the nanoemulsion described herein for production of a coating product.

Yet an aspect of the invention pertains to an emulsifier composition comprising:
a) one or more of:
    i) a free, unsaturated hydroxy fatty acid,
    ii) an oligoester of unsaturated hydroxy fatty acid, and/or
    iii) a hydroxy carboxylic acid ester of i) or ii) wherein the hydroxy carboxylic acid has a molecular weight of at most 250 g/mol, and
b) alkalizing agent containing a basic nitrogen atom.

The present inventors have found is advantageous to provide the suhfa and the alkalizing agent containing a basic nitrogen atom as a mixture as such a mixture is easily blended into an alkyd than other neutralized forms of the suhfa and furthermore contributes to the neutralisation of the alkyd.

In some preferred embodiments of the present invention the emulsifier composition comprises a total amount of
    i) a free, unsaturated hydroxy fatty acid,
    ii) an oligoester of unsaturated hydroxy fatty acid, and/or
    iii) a hydroxy carboxylic acid ester of i) or ii) wherein the hydroxy carboxylic acid has a molecular weight of at most 250 g/mol, in the range of 20-99% w/w, more preferably 50-95% w/w, even more preferably 70-90% w/w, and most preferably 75-85% w/w.

In other preferred embodiments of the present invention the emulsifier composition comprises a total amount of free, unsaturated hydroxy fatty acid in the range of 20-99% w/w, more preferably 50-95% w/w, even more preferably 70-90% w/w, and most preferably 75-85% w/w.

In some preferred embodiments of the present invention the alkalizing agent containing a basic nitrogen atom has a molecular weight of at most 300 g/mol.

It other even more preferred embodiments of the present invention the alkalizing agent containing a basic nitrogen atom has a molecular weight of at most 150 g/mol.

In some preferred embodiments of the present invention the alkalizing agent containing a basic nitrogen atom contains one or two hydroxy groups.

In other preferred embodiments of the present invention the alkalizing agent containing a basic nitrogen atom comprises or even consists of one or more amino alcohols, and more preferably one or more alkanolamines.

In some preferred embodiments of the present invention the alkalizing agent containing a basic nitrogen atom comprises or even consists of one or more of 1-amino-2-propanol, 1-amino-3-propanol, and/or ethanolamine.

In some preferred embodiments of the present invention the emulsifier composition comprises a total amount of alkalizing agent containing a basic nitrogen atom in the range of 1-30% w/w, more preferably 2-25% w/w, even more preferably 4-20% w/w, and most preferably 5-15% w/w.

In some preferred embodiments of the present invention the emulsifier composition has a molar ratio between the total amount of alkalizing agent containing a basic nitrogen atom and the sum of fuhfa and ouhfa in the range of 1:3 to 5:1; more preferably in the range of 1:2 to 4:1, and even more preferably 1:1 to 3:1.

In other preferred embodiments of the present invention the emulsifier composition has a molar ratio between the total amount of alkalizing agent containing a basic nitrogen atom and the amount of fuhfa in the range of 1:3 to 5:1; more preferably in the range of 1:2 to 4:1, and even more preferably 1:1 to 3:1.

In some preferred embodiments of the present invention the emulsifier composition has a pH in the range of 4.8-11, more preferably in the range of 7.0-10.5, even more preferably a pH in the range of 8.0-10.4, and most preferably in the range of 8.5-10.3.

pH values mentioned herein are measured at 25 degrees C. and are measured by finely dispersing 10 g of the composition in question in 90 g of distilled water and subsequently measuring the pH.

In some preferred embodiments of the present invention the emulsifier composition furthermore comprises one or more additional emulsifiers. Useful examples of additional emulsifiers are e.g. non-ionic ethylene oxide propylene oxide block copolymer types of emulsifiers, alkylbenzene sulphonates, fatty alcohol ethoxylates, fatty alcohol ether sulphates, polyglycerol esters of fatty acids, polyglycerol polyricinoleate, and/or styrenated phenol-based surfactants.

The additional emulsifier may e.g. be co-surfactant which interacts with the uhfa and preferably improves its functionality but need not be a surfactant itself. Preferred co-surfactants can e.g. be found amongst glycol ethers, polyethylene glycols, and alkyl carboxylic acids and carboxylates.

It is often preferred to provide the emulsifier composition in packaged form, preferably packaged in drums, tanks, IBCs, pails, barrels, and/or cans.

Yet an aspect of the invention pertains to a method of producing the emulsifier composition, the method comprising the steps of:
combining:
    a) one or more of:
        i) a free, unsaturated hydroxy fatty acid,
        ii) an oligoester of unsaturated hydroxy fatty acid, and/or iii) a hydroxy carboxylic acid ester of i) or ii) wherein the hydroxy carboxylic acid has a molecular weight of at most 250 g/mol,
   b) alkalizing agent containing a basic nitrogen atom, and
   c) optionally, one or more additional ingredients, such as e.g. additional emulsifier,
combining a), b) and optionally c) in sufficient amounts to obtain the emulsifier composition, and
optionally, packaging the emulsifier composition.

The present invention has been described above with reference to specific embodiments. However, other embodiments than the above described are equally possible within the scope of the invention. The different features and steps of various embodiments and aspects of the invention may be combined in other ways than those described herein unless it is stated otherwise.

EXAMPLES

Example 1: Methods of Analysis

Example 1.1: Quantification of Fuhfa, Ouhfa and Hcuhfa in Alkyd Mixtures or Sources of Unsaturated Hydroxy Fatty Acids The amount of fuhfa, ouhfa and hcuhfa in alkyd mixtures or sources of unsaturated hydroxy fatty acids are quantified by HPLC using the following equipment and the following procedure.
   Equipment: Sonicator, assorted glass equipment, and an HPLC-system.
Instrument settings:
   Pump: Agilent 1100 Quaternary LC-pump.
   Injector: Agilent 1100 auto sampler
   Column: Luna 3u Silica (2) 100 A 100×4.60 mm.
   Column oven at 40° C.
   Detector: Agilent 1200 series LT-ELSD. 3.5 bar. Temperature 40° C. Gain 4.
   Alternative detection: MS-detection can be introduced for the identification of unknown peaks in the chromatogram. An example can be the Agilent 1100 series LC/MSD Trap.

TABLE 1

| | | Gradient/timetable: | | |
|---|---|---|---|---|
| No. | Time (min) | % C | % D | Flow (mL/min) |
| 1 | 0.00 | 98 | 2 | 1 |
| 2 | 0.04 | 98 | 2 | 1 |
| 3 | 2.82 | 62 | 38 | 1 |
| 4 | 3.00 | 2 | 98 | 1 |
| 5 | 5.29 | 2 | 98 | 1 |
| 6 | 5.33 | 98 | 2 | 1 |
| 7 | 7.05 | 98 | 2 | 1 |
| 8 | 10.00 | 98 | 2 | 1 |

Chemicals and Regents:
   Solvent mixture: Chloroform:Methanol in a ratio of (2:1)+10 mL/L 10% formic acid in Isopropanol.
Mobile phase:
   C. Hexane
   D. 800 mL Hexane+100 mL Isopropanol+100 mL Ethyl acetate+10 mL 10% formic acid in Isopropanol.

Chemicals
   Hexane, p.a., HPLC grade
   Formic acid p.a., (98-100%)
   Isopropanol p.a., HPLC grade
   Ethyl acetate p.a., HPLC grade
   Chloroform p.a., HPLC grade
Procedure:
   The samples to be analysed (between 75 and 200 mg depending on the expected concentrations), are dissolved in 10 mL of the solvent mixture each (full dissolution is secured by sonication of the sample+solvent mixture and visual inspection before further use of the material). Sonicate for 30 min at 48° C. If the samples are not dissolved totally, they must be filtrated prior to analysis. Filtration is done through a 0.45 μm Millipore membrane filter.
   HPLC analysis of the samples: Double determinations on all samples. Samples must be freshly prepared and analyzed in the same day.

Example 1.2: Determination of Iodine Value

The iodine value of a composition is determined according to "AOAC Method 993.20 (41.1.15). First Action 1993, Final Action 1996". The result is presented in the unit: g $I_2$/100 g sample.

Example 1.3: Determination of Hydroxyl Value

The hydroxyl value of a composition (defined as the amount of acetic anhydride consumed by acetylation of 1 gram of sample) is determined according to "AOAC Method 965.32 (41.1.12) Final action 1969, DGF, C-V 17a (98)". The result is presented in the unit: mg KOH/g sample.

Example 1.4: Determination of Acid Value

The acid value of a composition is determined according to "FCC 5. ed. APPENDIX VII: Fats and related substances p. 934". The result is presented in the unit: mg KOH/g sample.

Example 1.5: Determination of Water Content

The water content of a composition is determined gravimetrically according to FAO "Combined compendium of food additive specifications", vol. 4, p. 216-217, 2006, ISBN 92-5-105569-6" and the result is reported in as weight percent water relative to the total weight of the composition. If the water content measured by gravimetry is less than 2.0% w/w a new determination of the water content is performed using Karl Fisher method according to AOCS Official Method Ca 2e-84 and the result of the Karl Fisher method is used as the water content.

Example 1.6: Determination of VOC

The VOC content of a water-free material such as alkyds and water-free alkyd mixtures is measured according to ASTM D2369-10(2015)e1, Standard Test Method for Volatile Content of Coatings, (ASTM International, West Conshohocken, PA, 2015, www.astm.org)
   The VOC content of a water-containing materials such as water-containing alkyd emulsions is measured according to STM D6886 (ASTM D6886-18, Standard Test Method for Determination of the Weight Percent Individual Volatile Organic Compounds in Waterborne Air-Dry Coatings by Gas Chromatography, ASTM International, West Conshohocken, PA, 2018, www.astm.org)

Example 1.7: Determination of the Average
Hydrodynamic Diameter of Particles in an
Emulsion The particle size distributions of the nanoemulsions were measured using a NanoBrook Omni from Brookhaven Instruments Corporation operating according to the principles of dynamic light scattering (DLS) (Thomas, S., Thomas, R., Zachariah, A. K. & Mishra, R. K. (Eds.). (2017) Thermal and Rheological Measurement Techniques for Nanomaterials Characterization, Elsevier Inc. pp. 37-49).

DLS, also called Photon Correlation Spectroscopy, is a method for measuring particle size and particle size distribution of dilute suspensions from 0.5 nm-10 μm. Small particles move quickly relative to larger particles as described by the Stokes-Einstein equation:

$$D = \frac{k_B T}{6\pi\eta R_0}$$

Where D is the diffusion coefficient, $k_B$ is the Bolzmans constant, T is temperature, η is the viscosity of the solvent, and $R_0$ is the hydrodynamic radius.

During a measurement the dilute solution containing the particles is illuminated by laser and the intensity fluctuations in the detected scattered light is analysed and related to Brownian motion. The fluctuations in scattered laser intensity is analysed by a digital correlator and the resulting correlation function is related to the Brownian motions of the particles and further fitted to a size distribution; a fast decaying correlation function is indicative of very small particles, whereas a slowly decaying correlation function corresponds to larger sized particles. In order to avoid multiple scattering events of the laser light, the emulsion should be highly diluted during sampling.

Mean hydrodynamic diameter was measured at a scattering angle of 90° at a wavelength of 640 nm by using a high power diode laser (35 mW) under the following conditions: particle refractive index 1.59, water refractive index 1.331, viscosity 0.933 Cp and at temperature of 23° C. Five measurements with a duration of 300 seconds were performed and the average value obtained based on the intensity distribution was used to report the size distribution of particles.

Example 2: Production of Alkyd Emulsions Based
on Different Alkyds and Emulsifiers Starting Materials A large number of potential biobased emulsifiers were tested in standard and experimental alkyd systems. In the following examples the compounds in Table 2.1 were employed.

TABLE 2.1

| | | | Acid value (mg KOH/g sample) | Iodine Value (g I2/ 100 g sample) | Hydroxyl value (mg KOH/g sample) | Water content (% w/w) |
|---|---|---|---|---|---|---|
| Emulsifier | Chemical composition | Purity of the component | | | | |
| SSL | Sodium stearoyl lactylate (Palsgaard ® 3426) | Approx. 70% | 60-80 | <5 | <1 | ~0 |
| SSL/PGPR | Sodium stearoyl lactylate (Palsgaard ® 3426)/polyglycerol polyricinoleate (Palsgaard ® 4150) | 50%/50% | 60-80/ 2-3 | <5/ 70-90 | 80-100 | ~0 |
| SRL | Sodium ricinoleyl lactylate | Appr. 100% | 60-72 | 65-72 | 95 | ~0 |
| RA | Ricinoleic acid: Free RA di-RA | Appr. 71% Appr. 15% | >175 | 80-91 | >150 | ~0 |
| Neutralized RA | Ricinoleic acid: Free RA di-RA 1-amino-2-propanol | Appr. 57% Appr. 12% Appr. 20% | ~140 | 60-80 | >150 | ~0 |
| OA | Oleic acid | Approx. 100% | 195-203 | >86 | <1 | ~0 |
| 12-OH SA | 12-hydroxy stearic acid | Approx. 100% | >175 | <5 | >150 | ~0 |

Commercially available, experimental or conventional alkyd resins can be used in accordance with the present invention. These are exemplified by the resins with the constituents listed in Table 2.2. All resins used were solvent-free, i.e. a solid content of ~100%

TABLE 2.2

Types and compositions of the tested alkyds

| Alkyd | Constituents | Oil length | Solid content | Acid value (mg KOH/g) |
|---|---|---|---|---|
| A1 | Tall oil fatty acids Pentaerythritol Phthalic acid anhydride | Medium | >99% | 8 |
| A2 | Tall oil fatty acids Pentaerythritol Phthalic acid anhydride | Long | >99% | 9 |
| A3 | Tall oil fatty acids Pentaerythritol Adipic acid | Medium/long | 100% | 10 |

TABLE 2.2-continued

| | Types and compositions of the tested alkyds | | | |
|---|---|---|---|---|
| Alkyd | Constituents | Oil length | Solid content | Acid value (mg KOH/g) |
| A4 | Tung oil Maleic anhydride | Medium/long | 100% | N/A |
| A5 | Tall oil fatty acids Glycerol/pentaerythritol Azelaic acid | Medium/long | >95% | 8 |
| A6 | Linseed oil Isophthalic acid | Long | ~100% | 6 |

Preparation of the Alkyd Mixture(s)

30 g alkyd was weighed into a 250 mL Pyrex beaker at room temperature. 2.4 g (8% w/w) or 3.0 g (10% w/w) of the emulsifier was added and the mixture was briefly stirred at 200 rpm using an overhead Heidolph RZR 2041 stirrer equipped with a propeller impeller. Sufficient 27.7% NaOH solution was added to neutralize the emulsifier-alkyd mixture and ensure a pH of the final emulsion of 8-9.

Preparation of the Emulsions by Phase Inversion 30 mL demineralized water was added slowly at a rate of 30 mL/hour at either room temperature or 50° C. The addition of water initially produced a water-in-oil emulsion that spontaneously inverted to an oil-in-water emulsion by catastrophic phase inversion (Bouchama, F., van Aken, G. A., Autin, A. J. E., Koper, G. J. M. (2003). *On the mechanism of catastrophic phase inversion in emulsions. Colloids Surf.* A 231 (1-3), 11-17.).

Using the general procedures outlined above the emulsions in Table 2.3 were prepared.

TABLE 2.3

| | | Prepared emulsions | | | |
|---|---|---|---|---|---|
| Alkyd mixture sample | Alkyd | Emulsifier | Emulsifier concentration (w/w) | Temperature during water addition | Notes |
| A | A1 | SSL | 8% | 50° C. | |
| B | A1 | SSL/PGPR | 4%/4% | 50° C. | |
| C | A1 | SRL | 8% | 50 ° C. | |
| D | A1 | RA | 8% | 50° C. | |
| E | A1 | RA | 10% | 50 ° C. | |
| F | A1 | OA | 10% | 50 ° C. | |
| G | A1 | 12-OH SA | 10% | 50 ° C. | No phase inversion was observed |
| H | A2 | RA | 8% | Room temperature (RT) | |
| I | A3 | RA | 10% | RT | |
| J | A4 | RA | 10% | RT | |
| K | A5 | RA | 12% | RT | |
| L1 | A2 | Neutralized RA | 3% | RT | No additional base was added |
| L2 | A2 | Neutralized RA | 5% | RT | No additional base was added |
| L3 | A2 | Neutralized RA | 6% | RT | No additional base was added |
| L4 | A2 | Neutralized RA | 8% | RT | No additional base was added |
| L5 | A2 | Neutralized RA | 8% | RT | No additional base was added |
| L6 | A2 | Neutralized RA | 10% | RT | No additional base was added |
| L7 | A2 | Neutralized RA | 12% | RT | No additional base was added |
| M1 | A6 | Neutralized RA | 8% | RT | No additional base was added |

TABLE 2.3-continued

| | | Prepared emulsions | | | |
|---|---|---|---|---|---|
| Alkyd mixture sample | Alkyd | Emulsifier | Emulsifier concentration (w/w) | Temperature during water addition | Notes |
| M2 | A6 | Neutralized RA | 8% | RT | Alkyd neutralized with 27.7% NaOH |

CONCLUSION

All the tested emulsifiers were able to produce emulsions. The texture, appearance and stability of the emulsions differed significantly, however.

Emulsion A and B were both viscous white emulsions. A comparison of micrograph pictures of both emulsions can be seen in FIG. 1. It was immediately apparent that the droplet size improved greatly by the addition of PGPR to the emulsifier system.

Figure 2:
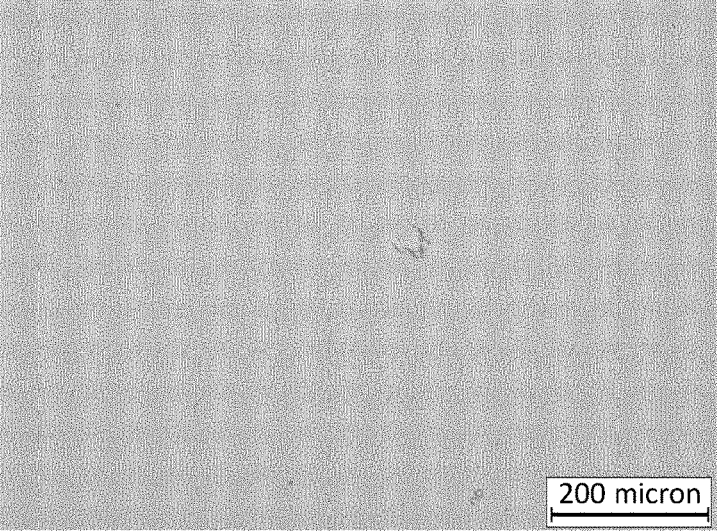
FIG. 2 shows a microscopy photo of a nanoemulsion according to the invention under settings comparable to FIG. 1. The alkyd droplets of the nanoemulsion are hardly visible.

Using SRL, which is a suhfa, the resulting emulsion C was a fine bluish nanoemulsion (FIG. 2). The droplet size distribution was found to be favourably correlated with the pH value of the emulsion. This nanoemulsion had a much lower viscosity than emulsion A and B and could easily be poured from the beaker to a storage vessel.

Emulsion D was based directly on 8% ricinoleic acid and had a similar bluish nanoemulsion appearance. The same could be concluded for emulsion E containing a slightly higher concentration (10%) of ricinoleic acid.

For comparison, emulsion F and G, based on oleic acid (an unsaturated fatty acid but not a hydroxy fatty acid) and 12-hydroxy stearic acid (a hydroxy fatty acid but not an unsaturated fatty acid), respectively, did not produce nanoemulsions. Emulsion F resulted in a grainy white emulsion that separated after a few days. Emulsion G was almost solid, gum-like and water repellent, which indicated that phase inversion probably did not occur during production.

Emulsion H-K all displayed the characteristics of a nanoemulsion. All had average droplet size distribution below 300 nm and very prolonged shelf lives on the order of months-years.

Emulsion L1-L7 showed the effect of systematically changing the concentration using the highly effective uhfa RA neutralized with an amine that might also function as a co-surfactant in the system. Droplet sizes down to below 120 nm were obtained using the highest concentrations of the emulsifier.

Emulsion M1 and M2 demonstrated that the neutralized RA is highly efficient in a linseed oil based alkyd. In addition, the use of a neutralized RA is efficient in itself even without neutralization of the alkyd, which is common practice during traditional alkyd emulsion production, as evident from the similar average droplet sizes. The inventors have observed that similar results are obtained if the alkalizing agent used to neutralize RA is ethanolamine.

Example 3: Preparation of a Paint Comprising an Alkyd Emulsion

The emulsions of Example 2 were used for preparing a paint by employing standard technology used for waterborne alkyd paints. This entails starting out with a suitable amount of water, adding the desired thickener, an in-can preservative and optionally additional biocide, followed by a suitable drier normally used with conventional alkyd resins, addition of an antifoaming agent, and finally the desired amount of emulsion to obtain the appropriate binder content of the final formulation.

An example of a clear coat paint minimal formulation based on alkyd emulsions is given below:

| Water | 25-35% |
|---|---|
| Thickener | 0-3% |
| Preservative | 0-1% |
| Drying agent | 0-1% |
| Defoamer | 0.1% |
| Alkyd emulsion | 55-75% |

An example of a standard matt paint formulation:

| Water | 10-15% |
|---|---|
| Pigment, e.g. $TiO_2$ | 10-15% |
| Filler, e.g. fine $CaCO_3$ | 25-30% |
| Filler, e.g. medium $CaCO_3$ | 25-30% |
| Dispersing agent | 0-2% |
| Thickener | 0-3% |
| Preservative | 0-1% |
| Defoamer | 0.1% |
| Drying agent | 0-1% |
| Alkyd emulsion | 10-15% |

Example of a waterborne trim/house paint:

| Water | 0-2% |
|---|---|
| Pigment paste | 30-40% |
| Drying agent | 0.5% |
| Defoamer | 0.3% |
| Alkyd emulsion | 60-70% |

Example 4: Characterisation and Comparison of Alkyd Emulsions

Particle Size

Figure 3:
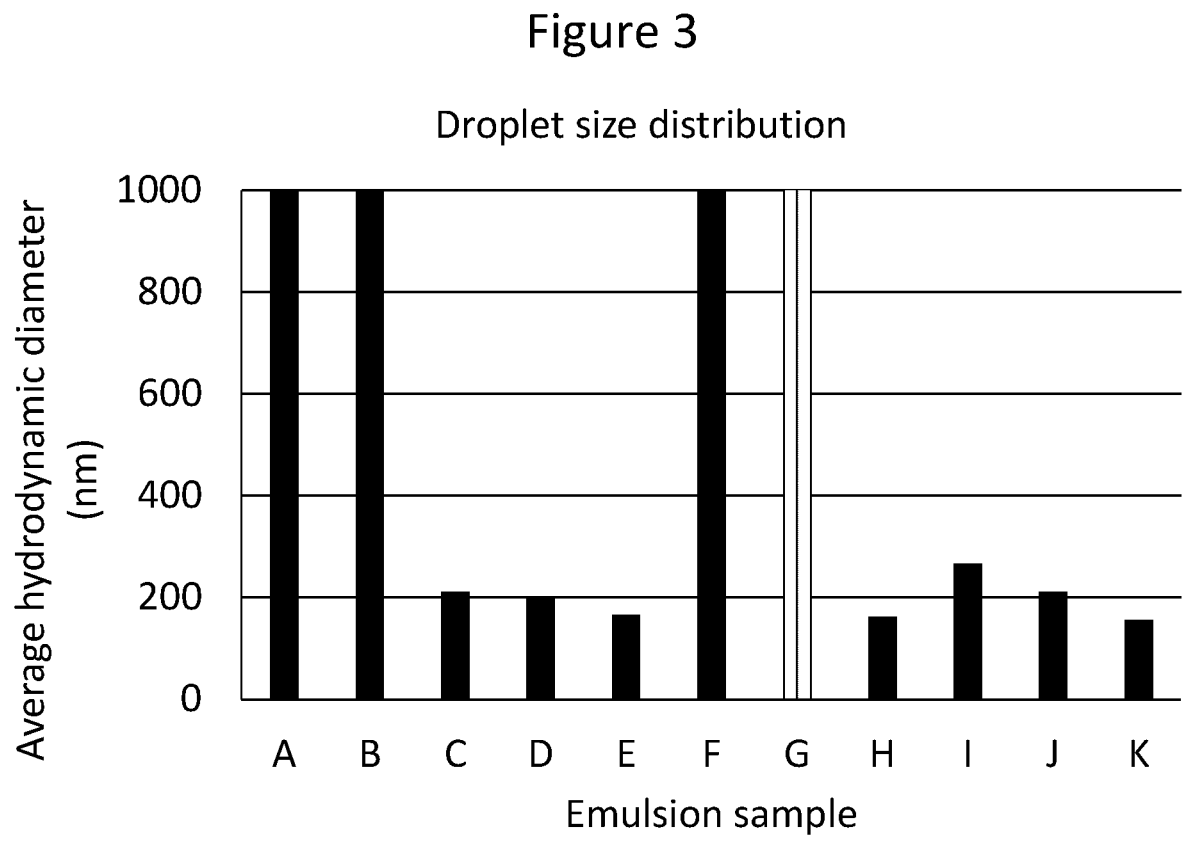
Figure 4:
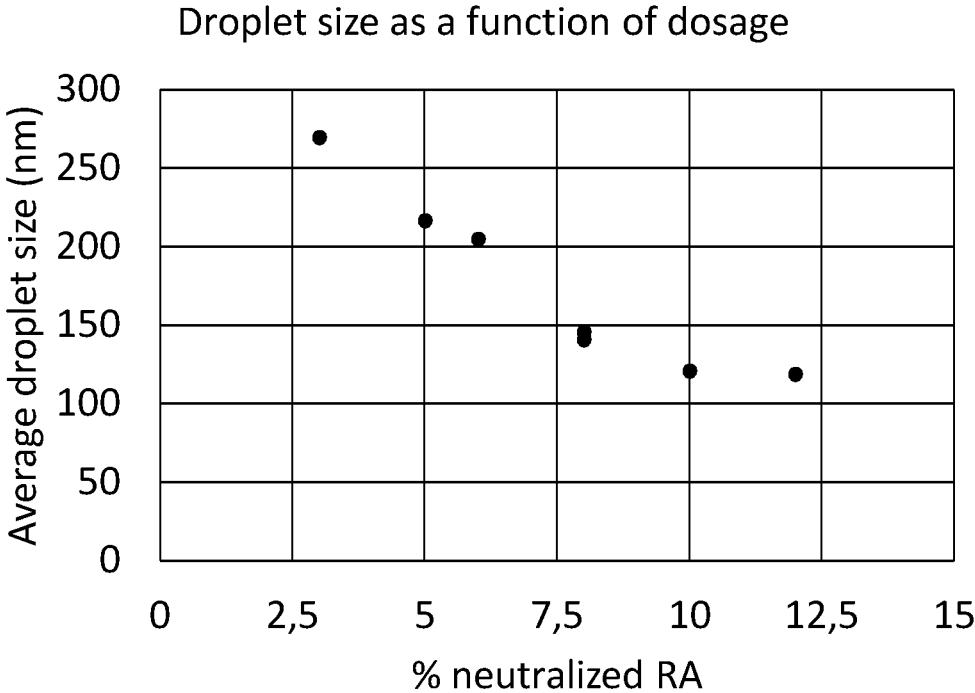
FIG. 4 shows how the alkyd droplet size depends on the dosage of neutralized ricinoleic acid.

The particle size distributions of emulsions A-K are depicted in FIG. 3. Very fine nanoemulsions were obtained for all trials involving a suhfa in the form of sodium ricinoleic lactylate, which may further undergo hydrolysis under alkaline conditions to release free ricinoleates, and with the direct use of ricinoleic acid. FIG. 4 shows the effect of emulsifier concentration on droplet size for the L emulsion series.

Emulsion Stability

Emulsion C, D, E, H, I, J, and K with average droplet sizes below 300 nm were all stable for longer than 12 months. Emulsion A phase separated within 3 months, emulsion B phase separated within 1 month, which was also the case for emulsion F. Emulsion G failed from the start. All emulsions in the L series are expected to be stable in excess of 12 months due to the very fine droplet sizes.

Visual Inspection of Coating

The paints containing the emulsions based on suhfa gave a nice clear coating when applied on wood and/or glass slides. The paint based on emulsion A became opaque over time whereas a paint based on emulsion C, D, or E remained transparent with a high gloss value.

UV Curing

Paint samples based on emulsion C, D, and E displayed good drying properties when exposed to outdoor light.

Under QUV testing conditions the films displayed good stability compared to standard alkyd paint formulations.

Conclusion

All results are collectively displayed in Table 4.

TABLE 4

| | | | | |
|---|---|---|---|---|
| Properties of alkyd emulsions | | | | |
| Emulsion | Average droplet size (nm) | Emulsion stability at room temperature (months) | Emulsion appearance | Coating appearance |
| A | ~50000 | <3 | Very viscous, white | Opaque |
| B | ~10000 | <1 | Viscous, white | Opaque |
| C | 210 | >12 | Pourable, bluish | High gloss |
| D | 200 | >12 | Pourable, bluish | High gloss |
| E | 164 | >12 | Pourable, bluish | High gloss |
| F | ~10000 | Few days | Grainy, white | N/A |
| G | failed | failed | Water repellent, gum-like solid | N/A |
| H | 161 | >12 | Pourable, bluish | N/A |
| I | 265 | >12 | Pourable, bluish | N/A |
| J | 210 | >12 | Pourable, bluish | N/A |
| K | 155 | >12 | Pourable, bluish | N/A |
| L1 | 270 | N/A | Pourable, bluish | N/A |
| L2 | 217 | N/A | Pourable, bluish | N/A |
| L3 | 206 | N/A | Pourable, bluish | N/A |
| L4 | 141 | N/A | Moderately viscous, grey-blue | N/A |
| L5 | 146 | N/A | Moderately viscous, grey-blue | N/A |
| L6 | 121 | N/A | Viscous, slightly opalescent | N/A |
| L7 | 119 | N/A | Viscous, slightly opalescent | N/A |
| M1 | 168 | N/A | Pourable, bluish | N/A |
| M2 | 176 | N/A | Pourable, bluish | N/A |

The inventors have found that alkyd emulsions stabilized by suhfa provide stable, biobased and environmentally friendly alternatives to conventional emulsions based on standard emulsifiers typically used for this purpose. The resulting films displayed high gloss and were very stable under all studied conditions. Some indications pointed to a stabilizing effect under UV light. This is most likely due to the ability of suhfa to take part in the autoxidative process during coat formation. The high gloss of the films supported the notion that the RA emulsifier became cross-linked within the coating, which is highly desirable in order to avoid migration of the emulsifier to the surface of the coating. Migration of the emulsifier often leads to lower quality paints due to buildup of hydrophilic components on the surface and the possibility of colour degradation if pigments are used in the paint formulation.

Example 5: Effect of Neutralization of the Suhfa and Impact on Resulting Alkyd Nanoemulsions

Materials and Experimental Setup

The suhfa was castor oil fatty acids rich in the unsaturated hydroxy fatty acid ricinoleic acid, RA. Two amino alcohols were employed as alkalizing agent, 1-amino-2-propanol and ethanolamine. Different molar ratios between the base and RA were investigated according to Table 5 and 6.

TABLE 5

RA neutralized with ethanolamine

| Molar ratio ethanolamine:RA | Mass base (g) | Mass RA (g) | Total mass (g) | % w/w base | % w/w RA |
|---|---|---|---|---|---|
| 1:1 | 2.0842 | 10.08 | 12.17 | 17.13 | 82.87 |
| 1:2 | 2.0567 | 20.04 | 22.09 | 9.31 | 90.69 |
| 2:1 | 4.1143 | 10.01 | 14.12 | 29.13 | 70.87 |
| 3:1 | 6.209 | 10.09 | 16.30 | 38.09 | 61.91 |
| 1:3 | 2.5097 | 30.01 | 32.52 | 7.72 | 92.28 |

TABLE 6

RA neutralized with 1-amino-2-propanol

| Molar ratio 1-amino-2-propanol:RA | Mass base (g) | Mass RA (g) | Total mass (g) | % w/w base | % w/w RA |
|---|---|---|---|---|---|
| 1:1 | 2.5279 | 10.03 | 12.56 | 20.13 | 79.87 |
| 1:2 | 2.5451 | 20.04 | 22.58 | 11.27 | 88.73 |
| 2:1 | 5.14 | 10.01 | 15.15 | 33.92 | 66.08 |
| 3:1 | 7.5471 | 10.03 | 17.57 | 42.94 | 57.06 |
| 1:3 | 2.5328 | 30.03 | 32.57 | 7.78 | 92.22 |

The pH of a 10% w/w solution of the neutralized RA in demineralized water was measured and 8% w/w of the neutralized RA relative to the alkyd was used to produce an alkyd emulsion using a standard long-oil alkyd. No additional alkalizing agent was added during emulsification. Average droplet size was evaluated for each nanoemulsion using dynamic light scattering according to example 1.7. Effect of Different Degrees of Neutralization of the Suhfa All results of the neutralization studies can be seen in Table 7.

TABLE 7

Impact on pH in a 10% solution of the neutralized RA and on the average droplet size in an alkyd nanoemulsion containing 8% w/w relative to alkyd of the neutralized RA.

| Base | Molar ratio - base:RA | pH (10% in water) | Average droplet size (nm) |
|---|---|---|---|
| Aminoethanol | 1:3 | 7.52 | 726 |
| | 1:2 | 7.6 | 397 |
| | 1:1 | 9.11 | 209 |
| | 2:1 | 10.09 | 153 |
| | 3:1 | 10.37 | 152 |
| 1-amino-2-propanol | 1:3 | 7.91 | 1033 |
| | 1:2 | 7.76 | 493 |
| | 1:1 | 9.28 | 207 |
| | 2:1 | 10.01 | 145 |
| | 3:1 | 10.26 | 134 |
| Pure RA i.e. no base | | 4.93 | No emulsion formed |

Figure 5:
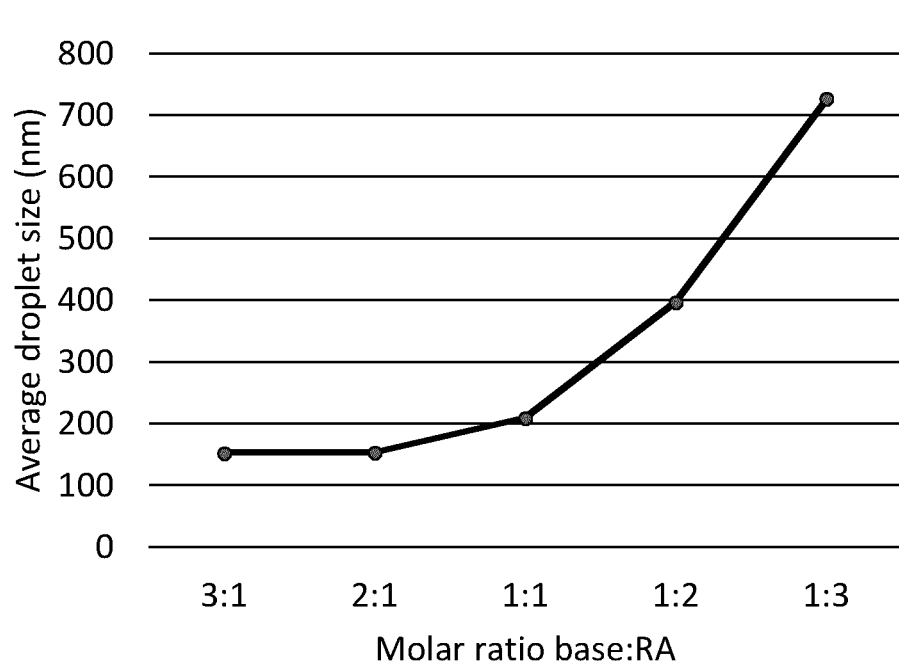
FIG. 5 shows how the molar ratio between ethanolamine (base) and ricinoleic acid (RA) impacts the average droplet size of an alkyd emulsion.
Figure 6:
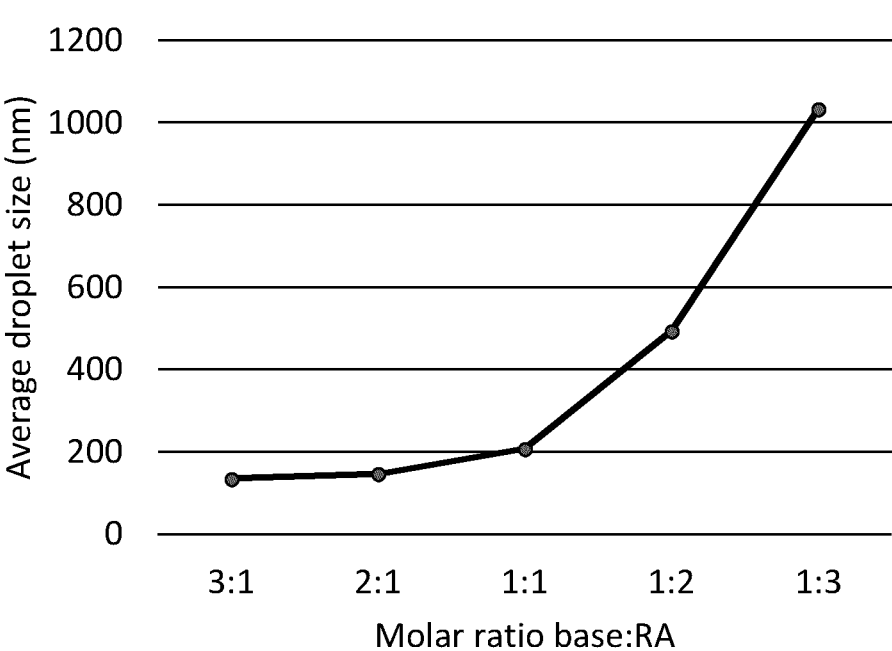
FIG. 6 shows how the molar ratio between 1-amino-2-propanol (base) and ricinoleic acid (RA) impacts the average droplet size of an alkyd emulsion.

The results of the different molar ratios between alkalizing agent and RA on the average droplet size of an emulsion of alkyd in water containing 8% w/w of the emulsifier mixture relative to the amount of alkyd are depicted in FIGS. 5 and 6 for ethanolamine and 1-amino-2-propanol, respectively.

The inventors have found that a molar ratio of 1:1 of the base to the RA yielded almost the same alkyd droplet diameter, i.e. 207/209 nm, regardless of the nature of the amino alcohol. Ethanolamine neutralization seemed to be slightly less sensitive to underdosing than 1-amino-2-propanol neutralization. An overdose of the base gave somewhat better results than a 1:1 ratio. This was due to the alkyd being neutralized by the excess of base, leading to a more hydrophilic system that was easier to emulsify. Note that this effect can also be achieved by adding an additional neutralizing agent to the alkyd mixture, which is common practice in the industry. The effect of the excess base seemed to be more or less constant for molar ratios in excess of 1:2.

The invention claimed is:

1. A nanoemulsion of nano droplets comprising alkyd, the nano droplets having an average hydrodynamic particle diameter of at most 350 nm and furthermore comprising a source of unsaturated hydroxy fatty acid (suhfa), said source comprises:
    i) a free, unsaturated hydroxy fatty acid (fuhfa),
    ii) a free oligoester of unsaturated hydroxy fatty acid (ouhfa) comprising di(unsaturated hydroxy fatty acid) (duhfa) and tri(unsaturated hydroxy fatty acid) (tuhfa), and/or
    iii) a free hydroxy carboxylic acid ester of i) or ii) wherein the hydroxy carboxylic acid has a molecular weight of at most 250 g/mol,
    wherein the weight ratio between the total amount of fuhfa+duhfa+tuhfa and the total amount of alkyd is in the range of 0.01-0.30.

2. The nanoemulsion of nano droplets comprising alkyd according to claim 1, having a weight ratio between the total amount of fuhfa+duhfa+tuhfa and the total amount of alkyd in the range of 0.02-0.25.

3. The nanoemulsion of nano droplets comprising alkyd according to claim 1, having a weight ratio between the total amount of fuhfa+duhfa+tuhfa and the total amount of alkyd in the range of 0.05-0.18.

4. The nanoemulsion of nano droplets comprising alkyd according to claim 1, wherein the source of unsaturated hydroxy fatty acid (suhfa) comprises at least 50% w/w of fuhfa.

5. The nanoemulsion of nano droplets comprising alkyd according to claim 1, wherein the suhfa has an iodine value in the range of 60-100 g I2/100 g.

6. The nanoemulsion of nano droplets comprising alkyd according to claim 1, wherein the suhfa comprises a C14-24 fatty acid.

7. The nanoemulsion of nano droplets comprising alkyd according to claim 1, wherein the suhfa comprises one or more of ricinoleic acid, lesquerolic acid, densipolic acid, and auricolic acid.

8. The nanoemulsion of nano droplets comprising alkyd according to claim 1, wherein the suhfa comprises ricinoleic acid.

9. The nanoemulsion of nano droplets comprising alkyd according to claim 1, wherein the alkyd comprises long oil alkyd, medium oil alkyd, and/or short oil alkyd.

10. The nanoemulsion of nano droplets comprising alkyd according to claim 1, wherein the nano droplets of the nanoemulsion contain a total amount of alkyd of at least 60% w/w.

11. The nanoemulsion of nano droplets comprising alkyd according to claim 1, wherein the nano droplets of the nanoemulsion contain a total amount of alkyd of at least 90% w/w.

12. The nanoemulsion of nano droplets comprising alkyd according to claim 1, wherein the nanoemulsion is an emulsion of nano droplets comprising alkyd in an aqueous medium, which aqueous medium contains water in an amount of at least 50% w/w.

13. The nanoemulsion of nano droplets comprising alkyd according to claim 1, wherein the nano droplets comprising alkyd furthermore comprises an alkalizing agent containing a basic nitrogen atom, which alkalizing agent is a primary amine, a secondary amine, a tertiary amine, or a combination thereof.

14. The nanoemulsion of nano droplets comprising alkyd according to claim 13, wherein the alkalizing agent containing a basic nitrogen atom has a molecular weight of at most 300 g/mol.

15. The nanoemulsion of nano droplets comprising alkyd according to claim 14, having a molar ratio between the alkalizing agent containing a basic nitrogen atom and the sum of fuhfa and ouhfa in the range of 1:3 to 5:1.

16. Nano droplets comprising alkyd, the nano droplets having an average hydrodynamic particle diameter of at most 350 nm and furthermore comprising a source of unsaturated hydroxy fatty acid (suhfa), said source comprises:

i) a free, unsaturated hydroxy fatty acid (fuhfa), ii) a free oligoester of unsaturated hydroxy fatty acid (ouhfa) comprising di(unsaturated hydroxy fatty acid) (duhfa) and tri(unsaturated hydroxy fatty acid) (tuhfa), and/or iii) a free hydroxy carboxylic acid ester of i) or ii) wherein the hydroxy carboxylic acid has a molecular weight of at most 250 g/mol, wherein the weight ratio between the total amount of fuhfa+duhfa+tuhfa and the total amount of alkyd is in the range of 0.01-0.30.

\* \* \* \* \*